(No Model.)
J. VANBUREN HAWKEY.
SELF LUBRICATING VEHICLE HUB.
No. 376,152. Patented Jan. 10, 1888.
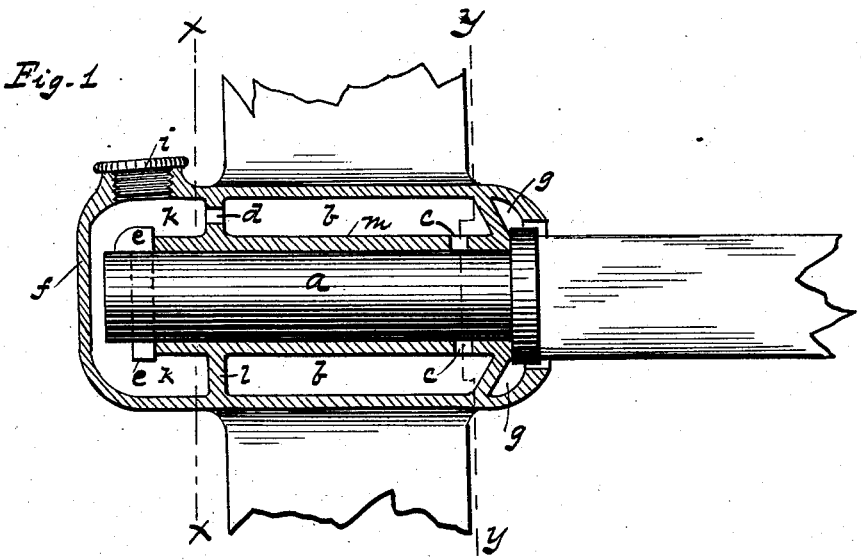
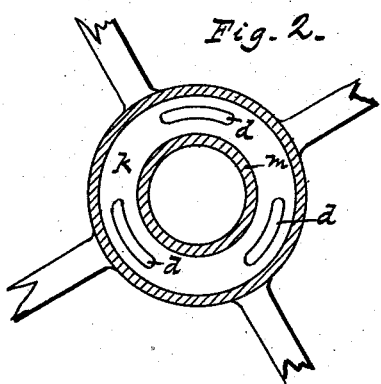 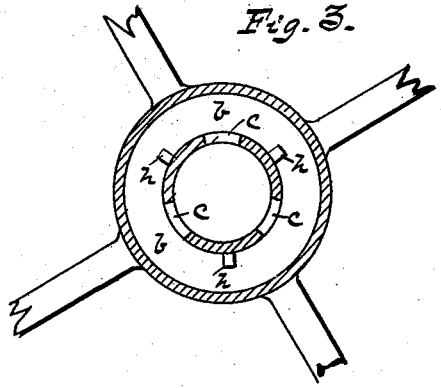
Witnesses:
Inventor:
John V. Hawkey
Per O. D. Levis
Atty.

United States Patent Office.

JOHN VANBUREN HAWKEY, OF GREENSBURG, PENNSYLVANIA.

SELF-LUBRICATING VEHICLE-HUB.

SPECIFICATION forming part of Letters Patent No. 376,152, dated January 10, 1888.

Application filed June 22, 1887. Serial No. 242,181. (No model.)

*To all whom it may concern:*

Be it known that I, JOHN VANBUREN HAWKEY, a citizen of the United States, residing at Greensburg, in the county of Westmoreland and State of Pennsylvania, have invented certain new and useful Improvements in Self-Lubricating Vehicle-Hubs; and I do hereby declare the following to be a full, clear, and exact description of the invention, such as will enable others skilled in the art to which it pertains to make and use the same, reference being had to the accompanying drawings, which form a part of this specification.

My invention relates to an improved self-lubricating and pit-car-vehicle hub, the object being to provide means whereby the journals of vehicles may be properly lubricated in an automatic manner. This I accomplish by certain details of construction and combination of parts, as will be fully described hereinafter.

In the accompanying drawings, Figure 1 is a vertical sectional elevation of my improved self-lubricating vehicle-hub constructed in accordance with my invention. Fig. 2 is a transverse vertical section of the same, taken on the line $x\ x$. Fig. 3 is a cross section on the line $y\ y$.

To put my invention into practice with a mine-car wheel such as are now in common use, I provide a hub, $m$, of a suitable size and form of construction. Surrounding this hub $m$ and integral therewith is an outer casing, which leaves an intermediate annular chamber, $b$, divided by a partition, $l$, provided with a suitable number of openings, $d$. At the front of the partition $l$ is a chamber, $k$, having a removable cap, $i$, by which access may be had to the linchpin $e$ when it is desired to remove or put the same in position. At the back or rear of the chamber $b$ are a number of openings, $c$, through the hub $m$, through which the lubricant passes to the journal $a$. At the rear of the hub is an annular groove, $g$, which collects and retains all waste oil from the axle or journal bearing $a$. In the chamber $b$, formed on or attached to the hub, are a number of ribs, $h$, extending in the direction of the length of the chamber $b$, which serve to retain the lubricant in all parts of the chamber $b$ while the same is being revolved.

The advantages of this self-lubricating hub are that, having a closed end, $f$, the oil cannot escape without first passing around the journal $a$, and also all waste or drip from the journal $a$ is avoided by the same being collected in the groove $g$, at the rear of the hub.

If it is desired to disconnect the wheel from the journal $a$, the cap $i$ is removed and the pin $e$ taken out of its place.

Having thus described my invention, what I claim, and desire to secure by Letters Patent, is—

A self-lubricating vehicle-hub having an annular recess, $b$, provided with a suitable number of openings, $c$, leading to the journal $a$, the removable cap $i$, for the purpose of placing the pin $e$ in position, and an annular recess, $g$, at the back of the hub, whereby the waste lubricant may be collected, substantially as described.

JOHN VANBUREN HAWKEY.

Attest:
 JAS. J. MCAFEE,
 M. E. HARRISON.